(12) United States Patent
Pritchard et al.

(10) Patent No.: US 10,174,830 B2
(45) Date of Patent: Jan. 8, 2019

(54) ACTIVE TRANSFER CASE WITH LUBE MANAGEMENT VALVE

(71) Applicant: BorgWarner Inc., Auburn Hills, MI (US)

(72) Inventors: Larry A. Pritchard, Macomb, MI (US); Branden L. Reeves, Oxford, MI (US); Denise A. Broick, Romeo, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/953,852

(22) Filed: Nov. 30, 2015

(65) Prior Publication Data

US 2017/0152936 A1 Jun. 1, 2017

(51) Int. Cl.
*F16H 57/04* (2010.01)
*B60K 17/344* (2006.01)
*B60K 17/342* (2006.01)
*B60K 17/346* (2006.01)
*B60K 17/35* (2006.01)
*B60K 23/08* (2006.01)
*F16H 57/02* (2012.01)

(52) U.S. Cl.
CPC ....... *F16H 57/0473* (2013.01); *B60K 17/342* (2013.01); *B60K 17/344* (2013.01); *B60K 17/3462* (2013.01); *B60K 17/35* (2013.01); *B60K 23/0808* (2013.01); *F16H 57/042* (2013.01); *F16H 57/043* (2013.01); *F16H 57/045* (2013.01); *F16H 57/0426* (2013.01); *F16H 57/0427* (2013.01); *F16H 57/0445* (2013.01); *B60Y 2400/424* (2013.01); *B60Y 2400/4242* (2013.01); *F16H 2057/02052* (2013.01)

(58) Field of Classification Search
CPC ...... B60K 17/00; B60K 17/34; B60K 17/344; B60K 2023/0858; B60K 2023/0875; B60K 17/342; F16H 27/042; F16H 27/0421; F16H 27/0424; F16H 27/0426; F16H 27/0467; F16H 27/0473; F16H 57/04; F16H 57/043; F16H 57/0434; F16D 13/74; F16D 2300/06; B60W 10/119; Y10T 74/19102
USPC ............... 192/85.3, 84.6, 113.35; 74/665 GE
See application file for complete search history.

(56) References Cited

U.S. PATENT DOCUMENTS 4,497,002 A * 1/1985 von der Heide ........ F16D 49/00
188/163
5,146,803 A * 9/1992 Chew ................... B25J 17/0241
74/25

(Continued)

FOREIGN PATENT DOCUMENTS

DE 102009027534 A1 * 1/2011 ........... F16H 57/043
GB 259222 A * 11/1926 ......... F16H 57/0427

*Primary Examiner* — Victor L MacArthur
*Assistant Examiner* — Joseph Brown
(74) *Attorney, Agent, or Firm* — BrooksGroup (57) ABSTRACT

A product may include a pair of rotating elements. A coupling may be connected between the pair of rotating elements. An actuator may be connected to the coupling and may engage and disengage the pair of rotating elements from each other. A valve may be connected with the actuator and may effect a supply lubrication to the coupling when the pair of rotating elements are engaged through the coupling.

15 Claims, 5 Drawing Sheets

(56) References Cited

U.S. PATENT DOCUMENTS

| | | | | |
|---|---|---|---|---|
| 5,702,321 | A * | 12/1997 | Bakowski | B60K 17/3467 180/249 |
| 5,704,867 | A * | 1/1998 | Bowen | B60K 17/3462 475/205 |
| 5,967,285 | A * | 10/1999 | Mohan | F16D 25/0638 192/103 F |
| 6,285,339 | B1 * | 9/2001 | McGill | F16M 11/10 248/278.1 |
| 7,484,437 | B2 * | 2/2009 | Brunazzi | A01K 5/001 180/344 |
| 7,624,853 | B2 * | 12/2009 | Ekonen | F16D 27/115 192/113.3 |
| 2010/0274456 | A1 * | 10/2010 | Kondo | B60K 23/08 701/69 |
| 2015/0176695 | A1 * | 6/2015 | Kumagai | F16H 57/042 74/405 |
| 2016/0097445 | A1 * | 4/2016 | Jongebloed | F16H 57/043 74/405 |
| 2016/0341300 | A1 * | 11/2016 | Drill | F16H 57/0457 |
| 2017/0089449 | A1 * | 3/2017 | Olson | F16H 57/0431 |

* cited by examiner

ACTIVE TRANSFER CASE WITH LUBE MANAGEMENT VALVE

TECHNICAL FIELD

The field to which the disclosure generally relates includes vehicle drivelines and more particularly, includes vehicle drivelines with all-wheel-drive drive capability.

BACKGROUND

Vehicle drivelines may include a combustion engine, an electric motor or another power plant for propulsion. Hybrid vehicles may include a combination of different types of power plants. An all-wheel drive, or four-wheel-drive, vehicle may include a connection between each wheel and one or more power plants.

SUMMARY OF ILLUSTRATIVE VARIATIONS

According to a number of illustrative variations, a product may include a pair of rotating elements. A coupling may be connected between the pair of rotating elements. An actuator may be connected to the coupling and may engage and disengage the pair of rotating elements from each other. A valve may be connected with the actuator and may effect a supply of lubrication to the coupling when the pair of rotating elements are engaged through the coupling.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
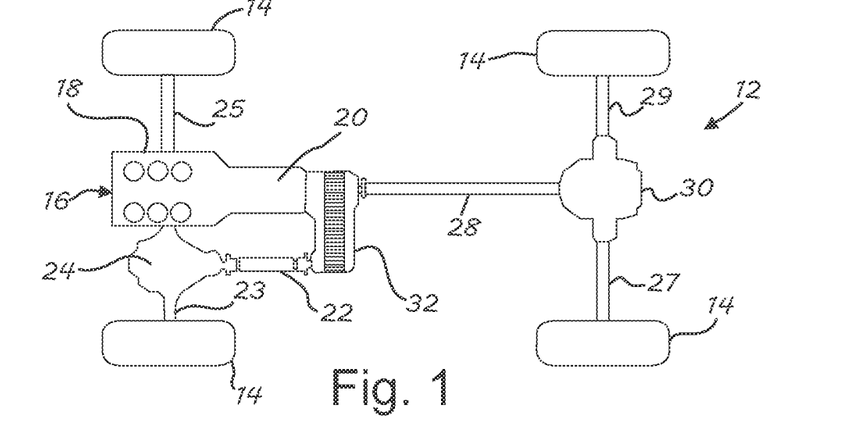
FIG. 1 is a schematic illustration of a vehicle according to a number of variations.

In a number of variations as illustrated in FIG. 1 a vehicle 12 may include a number of wheels 14, any number of which may be driven by a power plant 16. The power plant 16 may include an internal combustion engine 18 and transmission 20, or may include an alternative power source or a combination of power sources such as electric, hybrid, or other options. The vehicle 12 may include a propulsion shaft 22 that may be used to supply power from the power plant 16 to two of the wheels 14, which may be delivered through a differential 24 and axle shafts 23, 25. Another propulsion shaft 28 may be used to supply power from the power plant 16 to another two of the wheels 14, which may be delivered through a differential 30 and axle shafts 27, 29. A transfer case 32 may be connected between the power plant 16 and each of the propulsion shafts 22, 28, and may distribute power from the power plant 16 to one or both of the propulsion shafts 22, 28.

Figure 2:
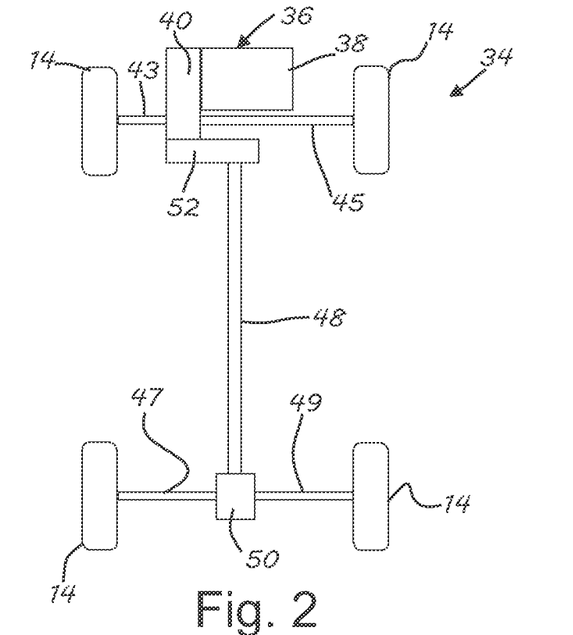
FIG. 2 is a schematic illustration of a vehicle according to a number of variations.

In a number of other variations as illustrated in FIG. 2, a vehicle 34 may also include a number of wheels 14, any number of which may be driven by a power plant 36. The power plant 36 may include an internal combustion engine 38 and transmission 40, or may include an alternative power source or a combination of power sources such as electric, hybrid, or other options. The transmission 40 may be a transaxle that may be used to supply power from the power plant 36 to two of the wheels 14, which may be delivered through axle shafts 43, 45. Another propulsion shaft 48 may be used to supply power from the power plant 36 to another two of the wheels 14, which may be delivered through a differential 50 and axle shafts 47, 49. A transfer case 52 may be connected between the power plant 36 and the propulsion shaft 48 and may distribute power thereto from the power plant 36. In a number of additional variations, a vehicle may include a transfer case connected in any number of different arrangements between a set of wheels and a power plant.

Figure 3:
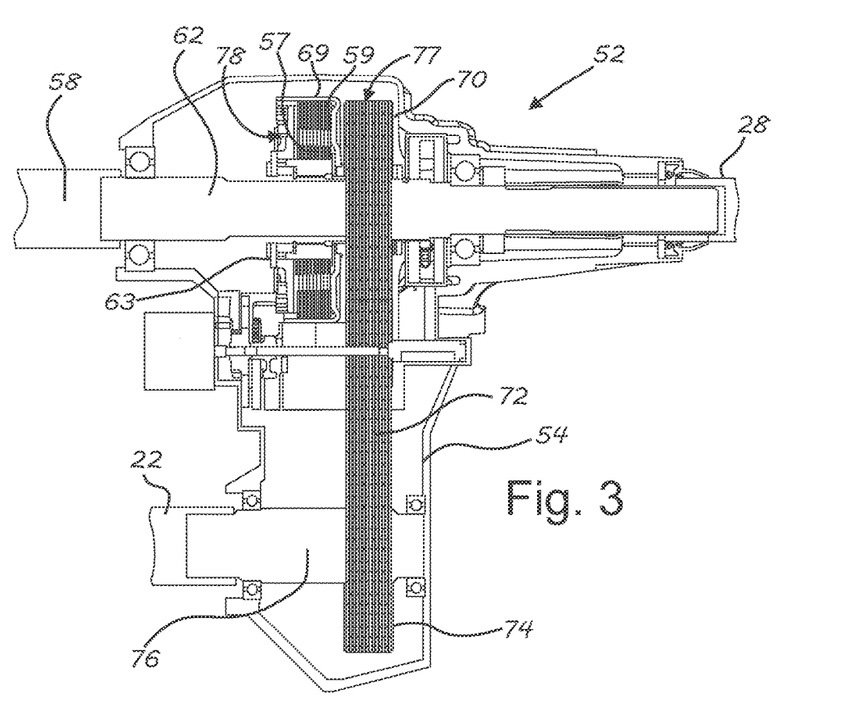
FIG. 3 is a schematic illustration of a product according to a number of variations.

In a number of variations as illustrated in FIG. 3, a product 52 may be used as a transfer case to provide power from a power plant to one or more propulsion shafts. The product 52 may include a case 54 through which a main shaft 62 may extend. The main shaft 62 may receive input from a power plant through an engaged driving shaft 58. Torque may be delivered through the main shaft 62 which, for example, may be connected to the propulsion shaft 28. Torque may also be delivered to a propulsion shaft such as the propulsion shaft 22, through an output shaft 76. A sprocket 70 may be rotationally positioned on the main shaft 62 and may be engaged to drive a chain 72. The chain 72 may be engaged with another sprocket 74 that may be connected to the output shaft 76. In a number of variations a coupling 78 may selectively engage and disengage a pair of rotating elements which may comprise the main shaft 62 and the sprocket 70. The coupling 78 may include an engagement mechanism 77 that may be a clutch, which may have a series of opposing friction discs, or may include another type of engagement mechanism. In a number of variations an inner set of friction discs 57 may be connected with the main shaft 62. An interleaved outer set of friction discs 59 may be connected with a clutch housing 69. The clutch housing 69 may be engaged with the sprocket 70. The coupling 78 may selectively engage the main shaft 62 and the sprocket 70. To operate the product in a two-wheel drive mode, the coupling 78 may disengage the pair of rotating elements comprising the main shaft 62, and the sprocket 70, so that they are not fixed to rotate together. Pressure may be relieved from the sets of friction discs 57, 59 so that they do not transfer torque. To operate the product 52 in an all-wheel-drive mode, or four wheel drive mode, pressure may be selectively applied to the sets of friction discs 57, 59 by the clutch actuator 63 so that they rotate together and transfer torque from the main shaft 62 to the sprocket 70. As a result, both propulsion shafts 22 and 28 may be driven.

Figure 4:
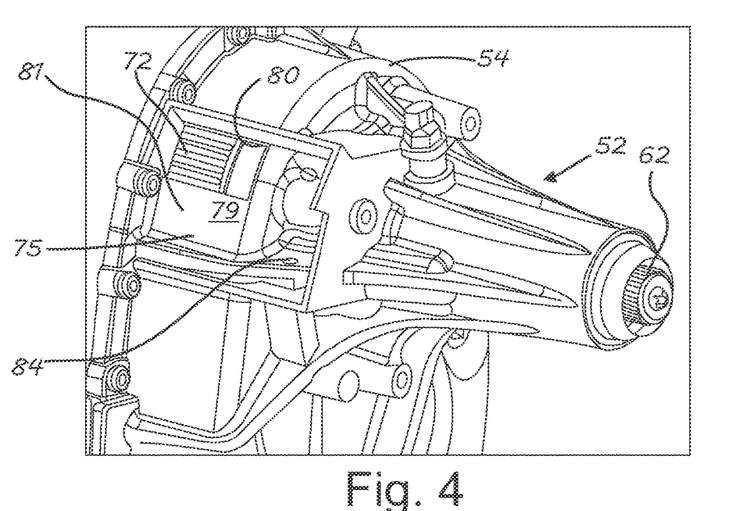
FIG. 4 is a partial isometric illustration of a product section according to a number of variations.

In a number of variations the product 52 may have a space 75 defined within the case 54 as shown in FIG. 4, where a part of the case 54 is removed to show the space 75. The space 75 may serve as a reservoir 79 and may have an opening forming an inlet port 80 through a wall 81 that extends between the chain 72 and the reservoir 79. The inlet port 80 may be provided adjacent the chain 72 so that lubricant carried by the chain 72 when traveling, may be deposited into the reservoir 79. An outlet port 84 may also be provided that serves as another opening through the case 54 to the reservoir 79. Other than the inlet port 80 and the outlet port 84 the reservoir 79 may be closed. With additional reference to FIG. 5, the outlet port 84 may lead to a passage 86 that may extend through a part of the case 54 to a valve chamber 88. The valve chamber may also be connected with a passage 90 that may lead to a chamber 92 within the case 54 around the main shaft 62. Accordingly, the area around the main shaft 62 may be opened to the reservoir 79 through the passage 86, the valve chamber 88, and the passage 90.

Figure 5:
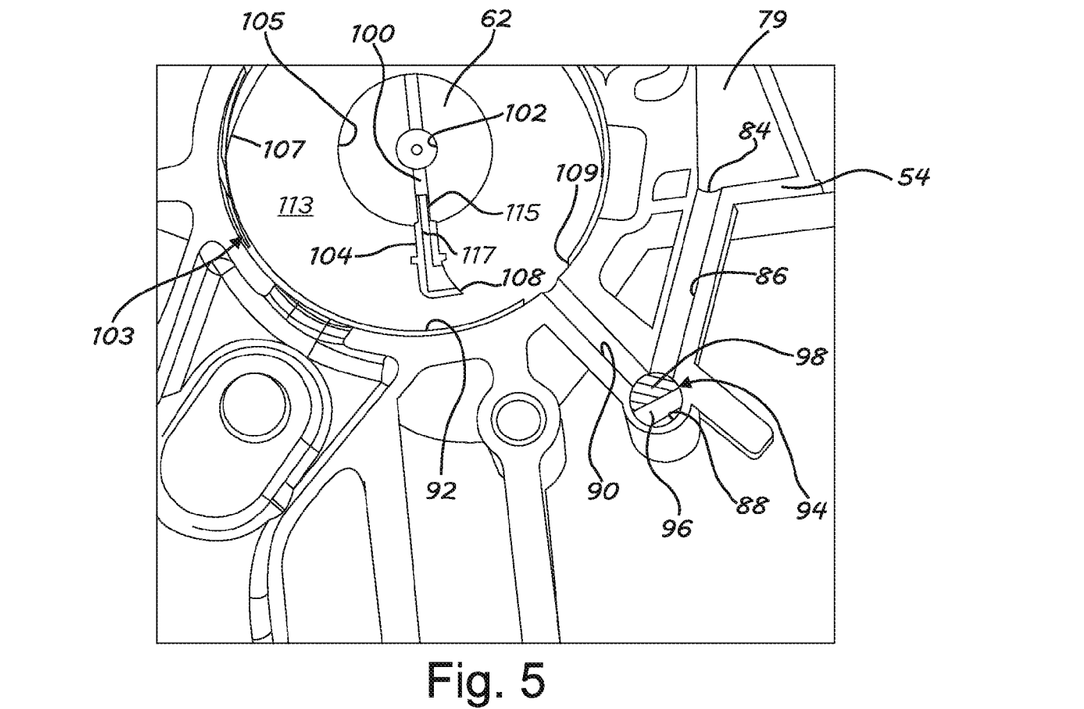
FIG. 5 is a partial outline illustration of a product section according to a number of variations.
Figure 6:
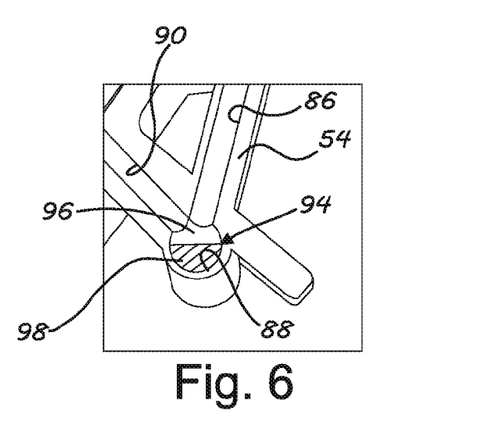
FIG. 6 is a partial outline illustration of a product section according to a number of variations.

In a number of variations the valve chamber 88 may contain a valve body 94 that may alternatively open or close the valve chamber 88 so that the passage 86 is alternatively opened to, or closed off from, the passage 90. The result is that lubricant may flow to the chamber 92 from the reservoir 79 when the valve chamber 88 is open and not when it is closed. As shown in FIG. 5, the valve body 94 may include a valley 96, which may be formed at a portion of the valve body 94 forming a stem 98 with a reduced cross section, which may be semi-circular shaped. As shown in FIG. 5, the valve body 94 may be rotated so that the stem 98 closes the passage 86 from the passage 90. As shown in FIG. 6, the valve body 94 may be rotated in the valve chamber 88 so that the valley 96 opens the passage 86 to the passage 90.

In a number of variations the main shaft 62 may include a number of passages as shown in FIG. 5 that may include a transverse passage 100 that may be open to a longitudinal passage 102. A scoop 104 may include a tube section 115 that may be positioned in the transverse passage 100. A cup section 108 may form a collection scoop for capturing lubricant when the main shaft 62 rotates. Lubricant may be collected by the cup section 108 and may be directed through passage 117 leading through the tube section 115 and into the transverse passage 100 for distribution through the main shaft 62. The scoop 104 may travel around in a canister 103. The canister 103 may be cylindrical in shape with closed ends and may have a center opening 105 in each of the closed ends through which the main shaft 62 may extend. The canister 103 may have a peripheral wall 107 extending between the closed ends. The peripheral wall 107 may have a number of openings such as an opening 109 which may register with the passage 90.

Figure 7:
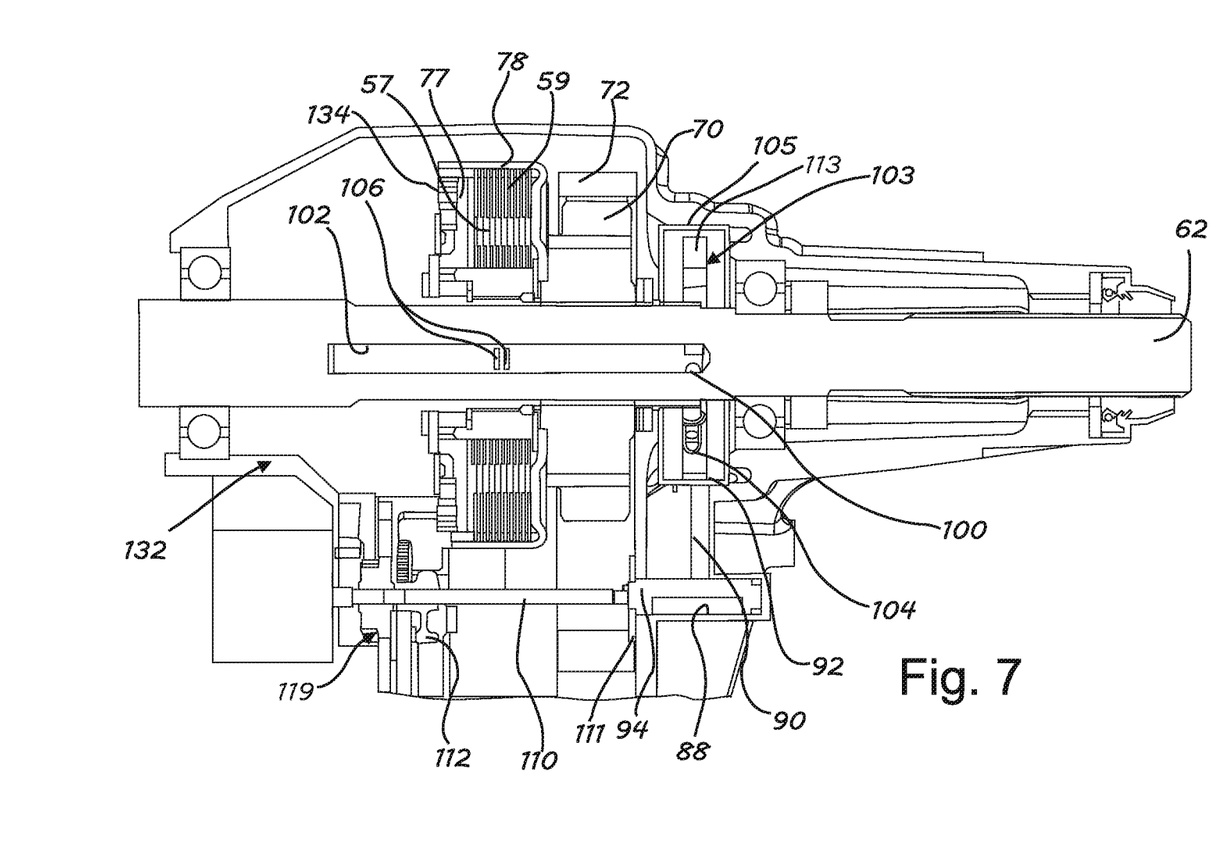
FIG. 7 is a partial outline illustration of a product section according to a number of variations.

As shown in the FIG. 7, the longitudinal passage 102 may extend through the main shaft 62 from the chamber 92, through the sprocket 70 and inside the coupling 78. An opening or openings 106 may extend transversely through the main shaft 62 intersecting with the longitudinal passage 102 within the coupling 78. Fluid for lubrication and cooling may be delivered to the coupling 78 from the reservoir 79 through a fluid path that may include the passage 86, the valve chamber 88, the passage 90, the chamber 92, the transverse passage 100, the longitudinal passage 102, and the transverse passage 106. The transverse passage 100 may open the longitudinal passage 102 to an oil gallery 113 defined in the chamber 92 by the canister 103.

Figure 8:
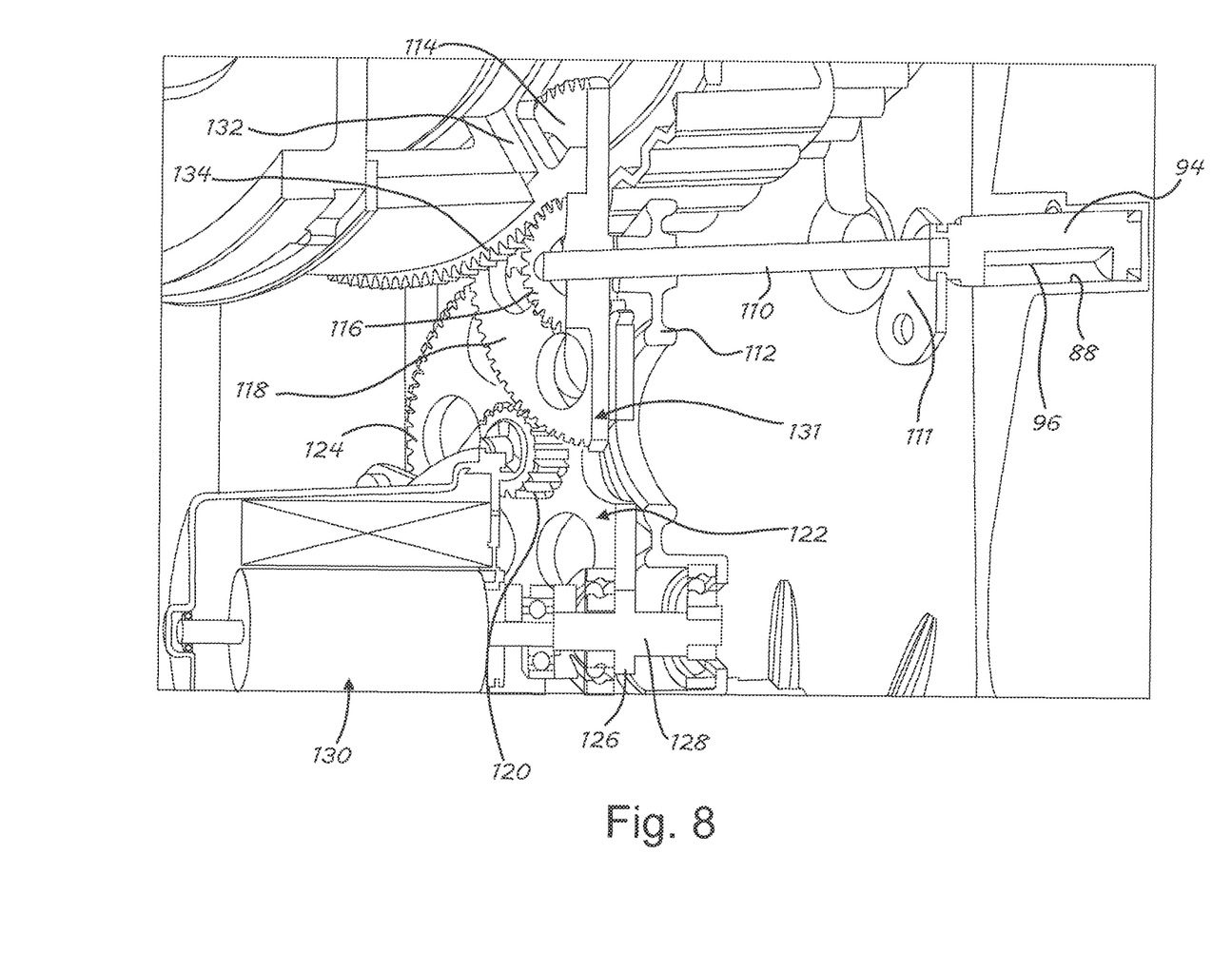
FIG. 8 is a partial outline illustration of a product section according to a number of variations.

In a number of variations the valve body 94 may be connected with an actuation mechanism 119 through a shaft 110. The shaft 110 may be connected to the valve body 94 at its proximal end and may be supported by a bracket 112 near its distal end. A bracket 111 may support the proximal end of the shaft 110 near or on the valve body 94. With additional reference to FIG. 8, the shaft 110 may be connected with a gear 114. The gear 114 may be a compound gear and may include a first gear 116 and a second larger gear 118. The gear 118 may mesh with and may be positively engaged to rotate with a gear 120. The gear 120 may be part of a compound gear 122 that may include a second larger gear 124. The gear 124 may mesh with and may be positively engaged to rotate with a gear 126. The gear 126 may be fixed to, or formed with, a shaft 128 of an actuator 130. The actuator 130 may be an electric motor or may be another type of rotary actuator. Operation of the actuator 130 may rotate the valve body 94 in the valve chamber 88 through the gear 126, the compound gear 122, the compound gear 114, and the shaft 110. The gears 126, 122 and 114 may form a gear train 131.

In a number of variations the coupling 78 may be engaged and disengaged by rotation of a clutch apply ring 132, which may cause the pressure plate 77 (shown in FIG. 7), to compress the sets of friction disks 57, 59. A gear 134 may be connected with the clutch apply ring 132 and may be engaged with the gear 116. Operation of the actuator 130 may rotate the clutch apply ring 132 through the gear 126, the compound gear 122, the compound gear 114, and the gear 134. As a result, operation of the actuator 130 may simultaneously rotate both the valve body 94 and the clutch apply ring 132. The valve body 94 may be oriented on the shaft 110 so that the valley 96 opens the passage 86 to the passage 90 when the coupling 78 is engaged. This may provide lubricant from the reservoir 79 to the coupling 78 when engaged and operating to drive the propulsion shafts 22 and 28. When the coupling 78 is disengaged by rotation of the clutch apply ring 132 under operation of the actuator 130, the valve body 94 may be rotated to close the passage 90 from the passage 86. This may result in an accumulation of lubricant in the reservoir 79 lowering the level elsewhere in the case 54 minimizing lube shear and parasitic losses, such as when operating in a two-wheel drive mode.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a pair of rotating elements. A coupling may be connected between the pair of rotating elements. An actuator may be connected to the coupling and may engage and disengage the pair of rotating elements from each other. A valve may be connected with the actuator and may effect a supply lubrication to the coupling when the pair of rotating elements are engaged through the coupling.

Variation 2 may include the product according to variation 1 and may include a shaft that may extend through the coupling. The shaft may define a series of passages through which lubrication may be supplied to the coupling.

Variation 3 may include the product according to variation 2 wherein the series of passages may include a first lateral passage, a longitudinal passage and a second lateral passage, which all may be interconnected.

Variation 4 may include the product according to variation 3 and may include a scoop connected to the first lateral passage. A canister may define a space within which the scoop travels.

Variation 5 may include the product according to variation 3 or 4 wherein the second lateral passage may be located inside the coupling.

Variation 6 may include the product according to any of variations 1 through 5 and may include a valve body that may be connected with the actuator through a shaft and a gear train.

Variation 7 may include the product according to variation 6 and may include a clutch apply ring that may be engaged with the coupling. The clutch apply ring may be connected with the actuator through the gear train.

Variation 8 may include the product according to variation 1 and may include a first shaft that may extend through the coupling. A second shaft may be spaced apart from the first shaft. A chain may connect the first and second shafts. The chain may turn the second shaft when the pair of rotating elements may be engaged through the coupling.

Variation 9 may include the product according to variation 8 and may include a case that may contain the pair of rotating elements, the coupling, the actuator and the valve. The case may define a reservoir on an opposite side of a wall from the chain.

Variation 10 may include the product according to variation 9 wherein an inlet port may be formed through the wall.

Variation 11 may include the product according to variation 10 wherein the valve may be contained in a valve chamber and a passage may extend through the case from the reservoir to the valve chamber.

Variation 12 may involve a product that may include a driving shaft, a first propulsion shaft, and a second propulsion shaft. A transfer case may be connected between the driving shaft, the first propulsion shaft and the second propulsion shaft. A coupling may be disposed in the transfer case, and may selectively couple the driving shaft with at least one of the first propulsion shaft or the second propulsion shaft. The transfer case may define a reservoir, and a fluid path through the transfer case from the reservoir to the coupling.

Variation 13 may include the product according to variation 12 and may include a valve body in the fluid path.

Variation 14 may include the product according to variation 13 and may include an actuator that may be connected to both the valve body and the coupling so that operation of the actuator may simultaneously move the valve body and the coupling.

Variation 15 may include the product according to variation 14 and may include a gear train that may be connected between the actuator and both the valve body and the coupling.

The above description of select variations within the scope of the invention is merely illustrative in nature and, thus, variations or variants thereof are not to be regarded as a departure from the spirit and scope of the invention.

What is claimed is:

1. A product comprising a pair of rotating elements, a coupling connected between the pair of rotating elements, an actuator connected to the coupling through a gear train to engage and disengage the pair of rotating elements from each other by actuating the coupling through the gear train, and a valve connected with the actuator through the gear train to effect a supply of lubrication to the coupling when the pair of rotating elements are engaged through the coupling;
    wherein one of the pair of rotating elements comprises a first shaft extending through the coupling, the shaft defining a series of passages through which lubrication is supplied to the coupling;
    a canister defining an oil gallery, wherein the first shaft extends completely through the canister and the oil gallery, and wherein the series of passages includes a first lateral passage extending radially in the first shaft, a longitudinal passage extending axially in the first shaft, and a second lateral passage extending radially in the first shaft, and wherein the series of passages are all interconnected, wherein the first lateral passage registers with the oil gallery and the second lateral passage registers with the coupling; and
    a scoop connected to the first lateral passage, wherein the scoop comprises a tube section and a cup section extending from a first end of the tube section, and wherein the canister defines a space within which the scoop rotationally travels, and wherein the tube section extends radially from the first shaft.

2. The product according to claim 1 wherein the second lateral passage is located inside the coupling.

3. The product according to claim 1 wherein the valve further comprises a valve body connected with the actuator through a valve shaft and the gear train.

4. The product according to claim 3 further comprising a clutch apply ring engaged with the coupling, wherein the clutch apply ring is connected with the actuator through the gear train.

5. The product according to claim 1 further comprising a second shaft spaced apart from the first shaft, a chain connecting the first and second shafts, the chain turning the second shaft when the pair of rotating elements are engaged through the coupling.

6. The product according to claim 5 further comprising a case containing the pair of rotating elements, the coupling, the actuator and the valve, the case defining a reservoir on an opposite side of a wall from the chain, and the wall of the case defining an inlet port that opens to the reservoir adjacent the chain so that a lubricant carried by the chain when traveling, is deposited into the reservoir.

7. The product according to claim 6 wherein the reservoir extends along the case from the chain to the canister.

8. The product according to claim 7 wherein the valve is contained in a valve chamber and a passage extends through the case from the reservoir to the valve chamber.

9. A product comprising a driving shaft, a first propulsion shaft, a second propulsion shaft, a transfer case connected between the driving shaft, the first propulsion shaft and the second propulsion shaft, wherein the transfer case comprises a main shaft operatively connected to the driving shaft; a coupling in the transfer case, selectively coupling the driving shaft with at least one of the first propulsion shaft or the second propulsion shaft, the transfer case defining a first reservoir, a wall of the case defining an inlet port that opens to the first reservoir adjacent a chain so that a lubricant carried by the chain when traveling is deposited into the first reservoir, a second reservoir surrounding the main shaft; a valve body and an actuator connected to both the valve body and the coupling so that operation of the actuator simultaneously moves the valve body and the coupling; wherein the valve body is connected to a valve shaft that is operably connected to the actuator; wherein when the valve body is moved to an open position, fluid drains from the first reservoir to the second reservoir; and a scoop comprising a tube section and a cup section, wherein the tube section is positioned within a passage extending radially through the main shaft and defined by an inner surface of the main shaft, wherein the scoop is constructed and arranged to rotate with the main shaft, and wherein the cup section is constructed and arranged to force oil into the passage in the main shaft to the coupling.

10. The product according to claim 9 further comprising a gear train connected between the actuator and both the valve body and the coupling.

11. A product comprising a main shaft comprising a transverse passage and a longitudinal passage in fluid communication with the transverse passage, a gear disposed on the main shaft, a coupling disposed on the main shaft adjacent the gear and the coupling selectively engaged so that the gear rotates with the main shaft and selectively disengaged so that the gear does not rotate with the main shaft, a case defining a chamber that contains the gear and coupling, the case defining a wall with an inlet port, and the case defining a reservoir disposed on an opposite side of the wall from the chamber, the inlet port opening from the chamber to the reservoir, and a chain engaged with the gear, the inlet port disposed adjacent the chain so that a lubricant carried by the chain when traveling, is deposited into the reservoir; an actuator, a valve driven by the actuator, a gear train connected with the coupling and connected with the actuator so that the actuator selectively drives the gear train to simultaneously close the valve and disengage the coupling, and the actuator selectively drives the gear train to simultaneously open the valve and engage the coupling, the reservoir holding the lubricant when the clutch is disengaged, and the reservoir releasing the lubricant to the chamber when the clutch is engaged; and an oil scoop, wherein the oil scoop comprises a tube section positioned within the transverse passage in the main shaft and a cup section constructed and arranged to collect oil and send oil through the tube section to the traverse passage and wherein a length of the tube section extends radially from the main shaft.

12. The product according to claim 11 wherein the valve includes a valve body, wherein the coupling includes a clutch apply ring, and comprising a first gear connected with the clutch apply ring, the first gear comprising a part of the gear train, and a second gear, wherein the second gear is a compound gear that engages the first gear and comprising a valve shaft connected with the second gear and with the valve body.

13. The product according to claim 11 comprising a valve for selectively holding the lubricant in the reservoir, wherein the case includes a first side and a second side, wherein the chamber is defined between the first side and the second side, the actuator is disposed on the first side and the valve is disposed on the second side, wherein the actuator is connected with the valve by a shaft that extends through the chamber.

14. The product according to claim 11 comprising a canister disposed around the main shaft in the chamber, the canister defining an oil gallery that receives the lubricant from the reservoir through a passage in which the valve is disposed, wherein the oil gallery is open to the reservoir when the valve is open.

15. The product as set forth in claim 11 wherein the valve comprises a valve body, and further comprising a valve shaft connected to the valve body and connected to the actuator.

* * * * *